Sept. 29, 1970

H. D. BUSH 3,531,695

ELECTROCHEMICALLY VARIABLE CAPACITOR

Filed June 14, 1968

INVENTOR.
HARRY D. BUSH

BY Henry K. Woodward
ATTORNEY

United States Patent Office 3,531,695

Patented Sept. 29, 1970

3,531,695

ELECTROCHEMICALLY VARIABLE CAPACITOR

Harry D. Bush, Cedar Rapids, Iowa, assignor to Collins Radio Company, Cedar Rapids, Iowa, a corporation of Iowa Filed June 14, 1968, Ser. No. 737,044
Int. Cl. H01g 9/14
U.S. Cl. 317—231 6 Claims

ABSTRACT OF THE DISCLOSURE

A hermetically sealed circuit is provided with an electrochemically variable capacitor which allows dimensionally smaller circuit packaging and facilitates circuit tuning. The capacitance of the capacitor is varied by changing plate area and spacing through employment of metal plating techniques.

This invention relates to electronic circuits and circuit components, and more particularly to hermetically sealed circuits having variable capacitors.

The variable capacitor is a common and necessary component in electrical circuits requiring precise tuning such as oscillators, filters, and the like. The conventional variable capacitor is adjusted mechanically, such as the butterfly capacitor, or by changing the voltage applied to the capacitor, such as with varactor diodes.

These variable capacitors have undesirable restrictions when used in hermetically sealed circuits. The mechanically adjustable capacitor requires moving seals or large volume for bellows, while the varactor diode requires elaborate power sources.

An object of this invention is an improved, hermetically sealed, tunable circuit.

Another object of the invention is an improved variable capacitor which is especially adapted for use in hermetically sealed circuits.

Still another object of the invention is a variable capacitor which can be adjusted electrically while hermetically sealed without the need for large volume or elaborate power source.

Another object of the invention is an improved method of tuning a variable capacitor in a hermetically sealed package.

These and other objects and features of the invention will be apparent from the following description and appended claims.

Briefly, in accordance with the invention a hermetically sealed circuit is provided with a capacitor which may be adjusted by electrically altering the plate area and plate spacing of the capacitor. The capacitor includes first and second conductor members having spaced surfaces which form the capacitor plates. At least one of the conductor members has a tapering cross section along one axis. The two surfaces are separated by a dielectric material which is of suitable chemical composition and has sufficient electrical conductivity to function as a plating solution. The conductor members and dielectric solution are sealed within a suitable insulating material.

The capacitor is varied by applying sufficient direct voltage across the conductor members to cause plating of material from one member to the other member. The plating action alters the capacitor plate area and capacitor plate spacing until a desired capacitance is obtained. Normal alternating circuit voltages will not cause plating action.

The invention will be more fully understood from the following detailed description and appended claims when taken with the drawing, in which:

Figure 1:
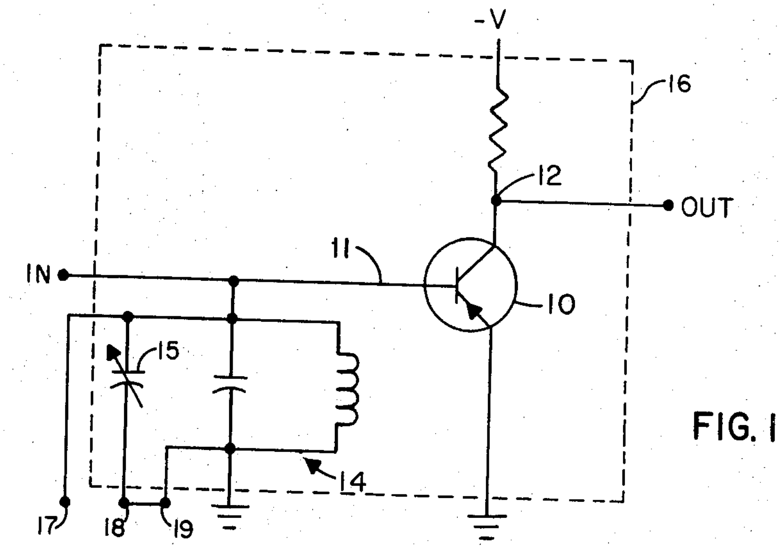
FIG. 1 is a schematic diagram of an illustrative tuned circuit including a variable capacitor in accordance with the invention.

Referring now to the drawing, FIG. 1 is a schematic of a tuned amplifier circuit including a variable capacitor in accordance with the invention, all of which has been encapsulated in a hermetically sealed package. It is to be understood that this circuit is illustrative as the variable capacitor can be advantageously employed in crystal oscillators and other circuits requiring fine tuning. Since the circuit is hermetically sealed, mechanically variable capacitors and varactors present problems in circuit tuning which are overcome by the capacitor in accordance with the present invention.

The tuned amplifier circuit comprises a transistor 10 having an input to the base electrode 11 and output taken at the collector electrode 12. The tuned circuit 14 connected between the base electrode 11 and ground determines the bandpass of the amplifier. The variable capacitor 15 is included in the tuned circuit to provide fine adjustment of the bandpass frequency. The circuit is mounted in a hermetically sealed package 16. Electric leads 17, 18 and 19 extend outside of package 16 so that variable capacitor 15 may be electrically disconnected from the circuit while the capacitor is being tuned.

Figure 2:
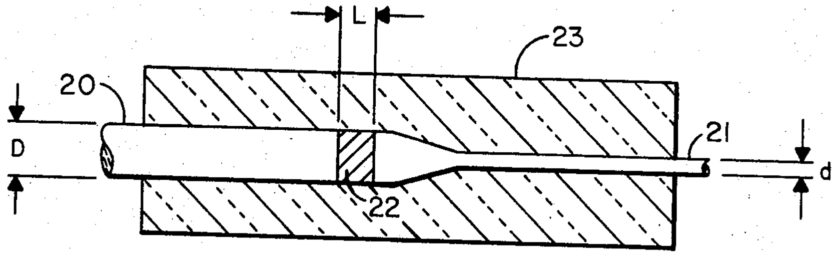
FIG. 2 is a cross section of a variable capacitor in accordance with the invention.

A variable capacitor in accordance with the invention and which is suitable for capacitor 15 in the circuit of FIG. 1 is shown in cross section in FIG. 2. Two rods 20 and 21 are positioned so that two end surfaces of the rods are adjacent and form the plates of the capacitor. The diameter of the rod 20 is designated D, and the diameter of the rod 21 tapers from a maximum diameter of D to a minimum diameter designated *d*. The spacing between the adjacent end surfaces of the two rods is designated L, and the space between the two rods is filled with a suitable dielectric 22 which may also function as a plating solution.

In a preferred embodiment, applicant has used copper rods and a very dilute solution (0.001 to 0.01 Normal) of copper pyrophosphate as the dielectric. The concentration of plating solution is limited by the desired quality of the capacitor as discussed below.

The two rods and dielectric plating solution are encapsulated by suitable insulating material 23 such as lucite. Other suitable plastics and glasses may also be used.

After the variable capacitor is connected in the circuit and the circuit is hermetically sealed in a suitable package, the variable capacitor is tuned by removing metal from rod 21 and depositing the metal on rod 20 through means of conventional plating techniques. It may be necessary to disconnect the variable capacitor from the circuit by means of external connections, or possibly the variable capacitor can remain in the circuit while the plating voltage is applied across the two rods, depending on the specific circuit design. The obvious advantage of the latter method is that circuit tuning can be continuously monitored as the plating progresses. Once the desired capacitance is achieved the plating voltage is removed from the capacitor terminals.

Figure 3:
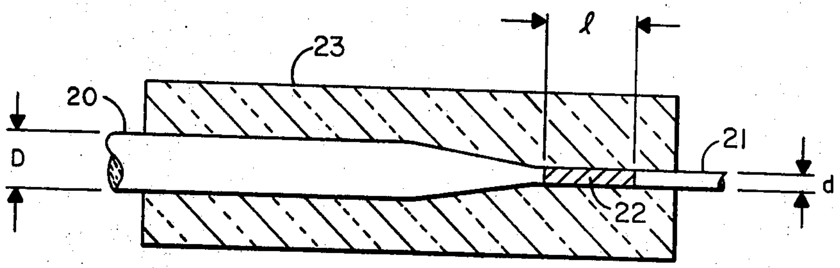
FIG. 3 is a cross section of the variable capacitor shown in FIG. 2 after tuning.

FIG. 3 is a cross section of the variable capacitor illustrated in FIG. 2 after the capacitor has been tuned to its minimum capacitance value. Since the volume of the dielectric material does not change, it is obvious that the length between the plates must become longer as the diameter of the plates become smaller. Thus, Volume of dielectric, $$V=\frac{\pi}{4}D^2L=\frac{\pi}{4}d^2l$$

and the length of the capacitor in the smaller diameter section, $l$, is given as follows:

$$l=\frac{D^2}{d^2}L$$

Since the capacitance of two parallel plates is given by $$C=\frac{\epsilon_0\epsilon A}{L}$$

where:

C is the capacitance,
$\epsilon_0$ is the permittivity of vacuum,
$\epsilon$ is the dielectric constant of the material between the plates,
A is the area of one of the plates and
L is the space between the plates.

From this equation, it follows that the maximum capacitance is given by $$C_{\max}=\frac{\epsilon_0\epsilon\pi D^2}{4L}$$

and the minimum capaictance of the capacitor is given by $$C_{\min}=\frac{\epsilon_0\epsilon\pi d^2}{4l}=\frac{\epsilon_0\epsilon\pi d^2}{4L\frac{D^2}{d^2}}=\frac{\epsilon_0\epsilon\pi d^4}{4LD^2}$$

and the ratio of the maximum capacitance to minimum capacitance is given by $$\frac{C_{\max}}{C_{\min}}=\frac{\frac{\epsilon_0\epsilon\pi D^2}{4L}}{\frac{\epsilon_0\epsilon\pi d^4}{4LD^2}}=\frac{D^4}{d^4}$$

Thus it follows that the range of the variable capacitance is established by the maximum rod diameter and minimum rod diameter.

It is to be recognized that since the plating solution must have some conductance, the quality of the capacitor will be less than the quality of a similar capacitor having a conventional dielectric between plates. The amount of conductivity which can be tolerated is dictated by the minimum quality required of the capacitor. Using the above equation for capacitance and the equation for resistance of $$R=\rho\frac{L}{A}$$

where:

R is the resistance,
$\rho$ is the resistivity, and
L is the space between the plates and
A is the area of one of the plates, the quality of the capacitor is given by the product of the resistance and capacitance or $$Q=RC=\rho\frac{L}{A}\times\epsilon_0\epsilon\frac{A}{L}=\rho\epsilon_0\epsilon$$

From this equation it is seen that the quality of the capacitor is independent of geometry and depends only on the dielectric material properties.

While the invention has been described with reference to specific embodiments, the description is illustrative and not to be construed as limiting the scope of the invention. Various modifications and changes may occur to those skilled in the art without departing from the spirit and scope of the invention as defined by the appended claims.

What is claimed is:

1. A variable capacitor comprising a first conductor member, a second conductor member, said first and second conductor members having surfaces in variably spaceable substantially parallel alignment, at least one of said surfaces being variable in area, means, including a dielectric material, disposed in contact with and between said surfaces for removing material from one of said surfaces and plating said material on the other of said surfaces, whereby the distance between said surfaces and the area of at least one of said surfaces change, and an insulating body encapsulating said means and at least the adjacent portions of said conductor members.

2. A variable capacitor as defined by claim 1 wherein at least one of said conductor members has a varying cross section along one axis of said conductor member.

3. A variable capacitor as defined by claim 1 wherein said first and second conductor members are copper and said dielectric material is a dilute solution of copper pyrophosphate.

4. A capacitor the capacitance of which may be altered by applying sufficient voltage to the terminals thereof to cause the removal of material from one capacitor plate and plating said material on another capacitor plate thereby altering capacitor plate area and spacing comprising first and second conductor members, said first and second conductor members having surfaces in variably spaceable alignment, means, including a dielectric material, in the space between said surfaces of said first and second conductor members for removing material from one of said conductor members and plating said material on the other of said conductor members, at least one of said conductor members having a varying cross sectional area along an axis of said conductor member whereby the selective removal from and addition of material to said conductor members, respectively, alters the area of at least one of said conductor members and alters the spacing between said surfaces of said first and second conductor members, and an insulating body encapsulating said means and at least the adjacent portions of said conductor members.

5. A variable capacitor as defined by claim 4 wherein said conductor members are copper.

6. A tunable, hermetically sealed electrical circuit comprising a hermetically sealed package, an electrical circuit mounted within said package, a tuned circuit portion in said electrical circuit, a capacitor in said tuned circuit portion comprising variably spaceable electrodes, with at least one of said electrodes being variable in surface area in response to voltage across said capacitor for causing plating action betwen said electrodes, said capacitor having means, including a dielectric material, between said capacitor electrodes for selectively plating material from either of said electrodes upon the other.

References Cited

UNITED STATES PATENTS

| | | | |
|---|---|---|---|
| 2,616,953 | 11/1952 | Boal | 317—230 |
| 2,791,473 | 5/1957 | Mattox | 317—230 X |
| 3,017,612 | 1/1962 | Singer | 317—231 X |
| 3,052,830 | 9/1962 | Ovshinsky | 317—231 |

JAMES D. KALLAM, Primary Examiner

U.S. Cl. X.R.

317—230